3,806,564
METHOD OF CHEMICALLY MODIFYING ASYMMETRIC MEMBRANES

Robert L. Riley, San Diego, and Harold K. Lonsdale, Los Altos, Calif., assignors to the United States of America as represented by the Secretary of the Interior
No Drawing. Filed Jan. 26, 1972, Ser. No. 221,099
Int. Cl. B29d 27/00
U.S. Cl. 264—41      7 Claims

ABSTRACT OF THE DISCLOSURE

Reveres osmosis membranes of cellulose acetate can be prepared with improved salt rejection. Following casting the membranes are dried and then treated with an acetylation agent to increase the degree of acetylation of the cellulose acetate.

BACKGROUND

Unlike other processes for the purification of saline water, reverse osmosis, as its name implies, has been developed not by imitating nature but by reversing a naturally occurring process. In the phenomenon of osmosis, solvent passes from a dilute to a more concentrated solution through a membrane which restricts the passage of salt. The flow of solvent continues until the pressure difference across the membrane reaches a certain point, the characteristic osmotic pressure of the system. Normally this process would not be satisfactory for extracting pure solvent since, in effect, it merely results in a partial mixing of the solutions on either side of the membrane. However, by applying a pressure greater than osmotic to the concentrated solution pure solvent will flow through the membrane in the opposite direction— from the concentrated to the dilute solution. For example, if saline water at a pressure greater than osmotic is brought in contact with an appropriate membrane, pure water may be recovered.

The "secret" to this process is in finding the appropriate membrane. In fact, reverse osmosis was not considered as a potential desalination process until late in the 1950's when it was discovered that cellulose acetate films allowed the passage of water but restricted the flow of dissolved sodium chloride. Since that time much of the research for developing reverse osmosis into a commercially acceptable desalination process has been centered on perfecting the osmotic properties of the membranes. Most importantly, membranes have been sought which have a high permeability to pure water (usually described in terms of flux—the flow rate per surface area of membrane) and simultaneously exhibit good selectivity or salt rejection. This last quality is generally measured by the percentage salt rejection defined as 100 times the difference of the salt concentration in the feed and that in the product divided by the concentration of salt in the feed. A final criterion for an economically feasible membrane is that it exhibit acceptable osmotic properties for a reasonable length of time.

Originally, attention was focused on cellulose acetate membranes for desalination, but experiments demonstrated inadequacies in the important property of water flux. Various techniques were tried to improve these early cellulose acetate membranes and thin films of other polymers were tested in search of a membrane with better osmotic properties. A break-through occurred when Loeb and his co-workers developed an important modification for preparing the cellulose acetate films. The process used in forming Loeb-type membranes is described, for example, in U.S. Pats. Nos. 3,133,132 and 3,133,137 herein incorporated by reference. Modifications of the basic technique are shown in U.S. Pats. Nos. 3,460,-683 and 3,497,072 to Cannon et al. also herein included by reference.

Although both the early membranes and those made by Loeb were of cellulose acetate, there was considerable differences between them. The early membranes were generally referred to as "dense" membranes, because they were of uniform density throughout the membrane. In contrast, the Loeb type membranes were called "asymmetric" because they consisted of a thick, porous water permeable layer which supported a thin, highly selective layer. Whereas the entire membrane thickness was responsible for the salt rejection of the early membranes, only the thin tight layer is selective in the asymmetric membranes. The thick porous layer provides structural support and allows the free passage of pure water away from the product side of the thin selective skin. The combination of these two layers is a membrane with a salt rejection comparable to that of the dense membranes and a flux which is significantly better.

It has also been found that the osmotic properties of cellulose acetate membranes may be varied by controlling their chemical composition. This is done by regulating the degree of substitution of various chemical groups for the three hydroxyl groups normally contained in each glucose unit in cellulose acetate. Particularly, various methods have been used to alter the acetate content of the membrane. It has been found that an increase in the degree of acetylation cellulose acetate membranes decreases the permeability of the membrane to both water and sodium chloride. However, since the permeability of the membrane to sodium chloride is more sensitive to the degree of acetylation, the salt rejection or selectivity of the membrane may be increased. The total effect of the increased acetylation is the production of a membrane which is less permeable to water but has a higher salt rejection.

Several techniques have been used to regulate the degree of acetylation of the membrane. Thus, the acetyl content has been altered by blending several types of cellulose acetate prior to casting the membrane (U.S. Pat. No. 3,460,683, previously mentioned) and the acetyl content has been reduced by hydrolysis after the membrane is formed (U.S. Pat. No. 3,920,286 to Kesting). Unfortunately, there does not seem to be a method available to increase the acetyl content of asymmetric cellulose acetate membranes after they are formed. One explanation for this difficulty is that these membranes are water equlibrated, requiring continuous immersion in water prior to their use. Thus, any reactant used to modify the membrane must be miscible yet nonreactive with water. The difficulty in meeting these requirements apparently has forced many into using the alternative approach of varying the acetyl content of the membrane prior to the casting of the membrane.

It is an object, therefore, of our invention to provide a process for increasing the acetyl content of an asymmetric cellulose acetate membrane after it has been cast.

More broadly, it is an object of our invention to provide a method for modifying an asymmetric cellulose acetate membrane or other water equilibrated membrane after it has been cast.

THE INVENTION

We have now found that the properties of an asymmetric membrane can be altered by chemically treating the membrane with the appropriate reagent after the membrane has been dried. In particular, we have found that asymmetric cellulose acetate membranes suitable for use in desalination by reverse osmosis can be dried and subjected to acetylation to enhance their selectivity.

Our invention avoids the difficulties of the prior art by utilizing recent improvements in techniques for drying water equilibrated reverse osmosis membranes. Prior to these recent developments it was impossible to dry cellulose acetate membranes without destroying their osmotic properties. We have now found that membranes which are successfully dried by these new techniques are admirably suited for further treatment by acetylation. Three techniques are presently available for drying water equilibrated membranes—solvent exchange (described in an article by R. L. Riley et al. appearing in Science, vol. 143, p. 801 (1966)) or multiple solvent exchanges (described in U.S. Pat. No. 3,592,672 to M. E. Rowley et al.): freeze drying (described in U.S. Pat. No. 3,428,584 to R. L. Riley and in an article by R. L. Riley et al. appearing in Desalination, vol. 1, pp. 30–34 (1966)); and the method described in an article by K. Vos and F. Burris in Industrial and Engineering Chemistry, vol. 8, pp. 84–89 (1969). In this last method the membrane is soaked in a solution of a surface active agent prior to being allowed to dry. Using these techniques a water equilibrated membrane may be dried without imparing its structural or osmotic properties. The above-identified references showing these techniques for drying membranes are herein incorporated by reference.

Thus, in the process of our invention an asymmetric membrane is prepared by any of the processes known in the prior art, such as that shown in the Loeb patents previously mentioned. The prepared membrane is then dried by any of the methods described above to produce a stable membrane which does not contain a significant amount of water which would interfere with subsequent reactions. For example, using the multiple solvent exchange technique, the water in the membrane is exchanged with a water-miscible solvent such as butyl alcohol which is subsequently exchanged with a nonpolar organic solvent, for example carbon tetrachloride. The carbon tetrachloride can then be evaporated to produce a dried membrane. The prepared membrane can also be dried by freezing the membrane to change the water associated with the membrane into ice and then subjecting the frozen membrane to vacuum conditions below the freezing point of water to cause the removal of substantially all of the ice by sublimation. Preferably, however, the membrane is dried by the method utilizing surface active agents described by Vos and Burris.

The dried membrane is then subjected to acetylation to improve its selectivity. As an alternative, since water is no longer present, the acetylating agent can be added with the carbon tetrachloride and then after acetylation, the carbon tetrachloride can be evaporated. The acetylation reaction may be carried out using any of the acetylating agents commonly known in the art such as acetic anhydride or acid or diacid chlorides. It may also be desirable to apply heat or to use a catalyst to speed up the reaction.

The acetylation reaction takes place with the hydroxyl radicals of the cellulose acetate, removing the hydrogen therefrom and substituting in its place the acetyl component of the acetylation agent. Where diacid chlorides are involved each end of the acetylation agent may react with a hydroxyl group on separate cellulose acetate molecules, thereby causing a certain amount of crosslinking. Completely acetylated cellulose acetate has 3 acetate groups per glucose unit and is described as having a degree of acetylation of 3.0. Generally, we expect that beneficial results will be achieved if the acetylation is carried out to a degree of acetylation within the range of about 2.5 to 2.9, preferably from about 2.6 to 2.8. However, other degrees of acetylation may also be desired depending on the flux and selectivity requirements of the membrane in the particular desalination system. As mentioned before, acetylation improves selectivity at the expense of water flux and the ultimate extent to which acetylation is carried must be determined by balancing these properties to achieve the most economical system.

This acetylation reaction will most readily be carried out in the liquid state by immersion of the membrane in an inert liquid medium, such as trifluorotrichloroethane or carbon tetrachloride, containing a small amount of the acetylation agent. In addition, other techniques for performing the reaction may be used. For example, vapors of the acetylation agent may be used to treat merely the thin selective surface of the asymmetric membrane. In any event, once the asymmetric membrane is dried, there is no restriction on the method of acetylation.

One of the advantages of the dried acetylated membranes is that they do not have to be stored or transported in water to retain desirable membrane properties. Instead, the membranes can remain dry until it is necessary to use them in reverse osmosis. At that time they can be rewetted for example by immersion in water until they reach their water equilibrated state.

Although the preceding description of our invention has been particularly concerned with the improvement of the membrane by acetylation, we also expect that improvements can be achieved by subjecting the dried membrane to other reactions such as acrylation which allows for subsequent crosslinking. We also expect that our general technique may be applied not only to membranes formed of cellulose acetate, but also to membranes of cellulose nitrate, cellulose butyrate, other cellulose esters, celluose ethers, and combinations thereof.

Finally, although our invention has arisen through work on the reverse osmosis desalination of sea water, these membranes are also improved by our invention for use in the separation of water from electrolyte solutions including sea water, brackish water, acid mine water, and industrial brines and bitterns; the separation of organic liquids; the purification and concentration of liquid foods such as citrus juices, beer, and syrups, and the purification of liquid wastes such as urine.

EXAMPLE 1

An asymmetric cellulose acetate membrane was prepared from the following casting solution:

| Component: | Parts/100 |
|---|---|
| Acetone | 66 |
| Cellulose acetate (39.9% acetyl) | 22 |
| Water | 11 |
| Magnesium perchlorate (anhydrous) | 1 |

This solution was cast on a glass surface at a temperature between 0° and 5° C. After exposing the membrane to air for 30 seconds to allow for evaporation of the solvent, the membrane was placed in ice water for a time sufficient to allow the membrane to gel (1 to 10 minutes). The membrane was annealed for 30 minutes at 85° C. and dried by the method using a surface active agent described in the article by Vos and Burris previously noted and incorporated by reference. This membrane was used as a control for comparison with the membranes subsequently subjected to acetylation.

A membrane (3 square inches) identically prepared was placed in 200 ml. of an inert liquid medium, trifluorotrichloroethane, to which 0.3 ml. of acetyl chloride was added. After two days at room temperature the cellulose acetate membrane was removed and found to be fully acetylated as evidenced by its insolubility in acetone and its solubility in chloroform.

The control membrane and the acetylated membrane were then tested in reverse osmosis desalination of a 1.0 percent aqueous sodium chloride solution at a temperature of 19° C. and an applied pressure of 1500 p.s.i. The average results of tests on two membranes are given in Table 1. The data clearly show a significant improvement in selectivity and a decrease in the water flux caused by the acetylation.

EXAMPLE 2

A membrane was prepared in the same manner as the control membrane in Example 1. This membrane was then esterified by being placed in 200 ml. of trifluorotrichloroethane containing 0.6 ml. of methacrylyl chloride. After 50 hours at room temperature (25° C.) the membrane was removed and the osmotic properties were then tested at the same conditions as in the previous example. These properties are listed in Table 1.

EXAMPLE 3

Membranes were prepared and tested as in Example 2 except that esterification was accomplished using 0.6 ml. of succinyl chloride in 200 ml. of trifluorotrichloroethane. Membrane properties are given in Table 1.

EXAMPLE 4

Membranes were prepared and tested as in Example 2 except that esterification was accomplished using 0.6 ml. of sebacoyl chloride in 200 ml. of trifluorotrichloroethane. Membrane properties are given in Table 1.

EXAMPLE 5

Again a membrane was prepared in the same manner as the control membrane in Example 1. In this case acetylation was accomplished by contacting the membrane with the acetylation agent in gaseous form. The membrane was suspended in a closed container which also housed an open flask of liquid acetyl chloride. The membrane was acetylated by reacting with the acetyl chloride vapors for 15 hours at 25° C.

Following acetylation the osmotic properties of the membrane were measured on a 2.0 weight percent sodium chloride solution at 19° C. using an applied pressure of 1500 p.s.i. The membrane had a salt rejection of 97.5%, a flux of 5.7 gallons/square foot-day, and a membrane constant of $.31 \times 10^{-5}$ g./cm.$^2$-sec.-atm.

TABLE 1

[Reverse osmosis results for chemically modified asymmetric membranes [1]]

| Example | Treating reagent | Membrane constant after 1 hr. ($10^{-5}$ g./cm.$^2$-sec.-atm.) | Water flux after 1 hr. (gal./ft.$^2$-day) | Salt rejection (percent) |
|---|---|---|---|---|
| Control | None | 0.65 | 12.9 | 97.8 |
| 1 | Acetyl chloride | 0.56 | 11.2 | 99.15 |
| 2 | Methacrylyl chloride | 0.73 | 14.6 | 98.4 |
| 3 | Succinyl chloride | 0.50 | 9.95 | 98.5 |
| 4 | Sebacoyl chloride | 0.14 | 2.6 | 97.4 |

[1] All tests were conducted on 1.0% weight NaCl solution at 19° C. and applied pressure of 1,500 p.s.i. The data given for each example represents the average results of two membranes tested.

We claim:

1. A method for modifying an asymmetric cellulose acetate membrane by increasing the acetyl content thereof, comprising the steps:
   (a) casting an asymmetric water equilibrated cellulose acetate membrane;
   (b) drying the cast membrane without impairing its structural or osmotic properties to form a dried membrane; and
   (c) acetylating said membrane to a degree within the range of about 2.5 to 2.9 to produce an improved asymmetric membrane with a greater degree of acetylation than as originally cast.

2. The process of claim 1 wherein said drying is accomplished by soaking said membrane in a surface active agent and then allowing said membrane to dry.

3. The process of claim 1 wherein said drying is accomplished by freezing said asymmetric water equilibrated cellulose acetate membrane to change the water associated with the membrane into ice and then subjecting the frozen membrane to vacuum conditions below the freezing point of water to cause the removal of substantially all of the ice by sublimation.

4. The process of claim 1 wherein said drying is accomplished by exchanging said water in said water equilibrated membrane with another solvent and then evaporating said solvent.

5. The process of claim 1 wherein said improved membrane has a degree of acetylation of from 2.6 to 2.8.

6. A process for forming an asymmetric cellulose acetate membrane suitable for the desalination of water by reverse osmosis, comprising:
   (a) casting an asymmetric water equilibrated membrane;
   (b) exchanging the water in said water equilibrated membrane with a water-miscible solvent;
   (c) exchanging the water-miscible solvent with a nonpolar solvent having an acetylating agent incorporated therein to acetylate said membrane to a degree within the range of about 2.5 to 2.9; and
   (d) evaporating said nonpolar solvent to form a dried membrane with a greater degree of acetylation than as originally cast.

7. The process of claim 6 in which said water-miscible solvent is an alcohol and said nonpolar solvent is carbon tetrachloride.

References Cited

UNITED STATES PATENTS

| 3,140,256 | 7/1964 | Martin et al. | 210—506 |
| 3,428,584 | 2/1969 | Riley | 210—500 |
| 3,592,672 | 7/1971 | Rowley et al. | 210—500 |

OTHER REFERENCES

Riley et al., Science, vol. 143, pp. 801 to 803 (1964).

Vos et al., I & EC Product Research and Development, vol. 8, No. 1 (March 1969), pp. 84 to 89.

MELVYN I. MARQUIS, Primary Examiner

U.S. Cl. X.R.

210—500; 264—49